June 5, 1928.
F. GIORDANO
1,672,565
LUMINOUS NUMBER PLATE FOR MOTOR VEHICLES
Filed March 4, 1926
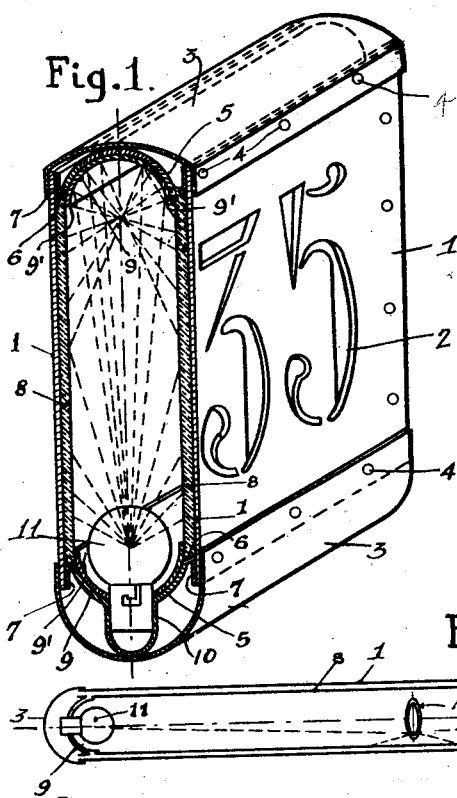
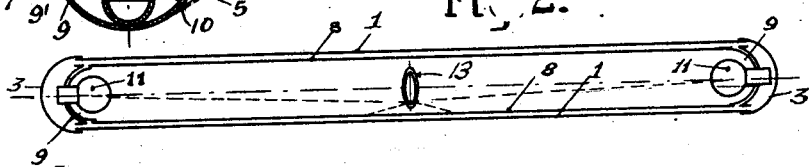
Inventor,
Filippo Giordano Patented June 5, 1928.

1,672,565

UNITED STATES PATENT OFFICE.

FILIPPO GIORDANO, OF TURIN, ITALY.

LUMINOUS-NUMBER PLATE FOR MOTOR VEHICLES.

Application filed March 4, 1926, Serial No. 92,245, and in Italy June 6, 1925.

This invention relates to luminous number plates for motor vehicles of the box-shaped type wherein both larger faces of the box carry the signs, and has for its object certain improvements adapted to make the box more compact and simple in construction and to ensure in a simple way a better diffusion of light on the walls to be illuminated.

According to the present invention the source or sources of light is or are arranged in proximity to the smaller sides of the box so as to illuminate directly the nearer portions of the said faces, and a device is provided for concentrating and distributing light to the remaining portions of the plate faces.

The accompanying drawings show by way of example two constructional forms of the invention.

Figure 1 is a partly perspective and partly cross-sectioned view showing how the arrangement of lamps and reflectors, according to the invention, tends to illuminate evenly both faces of box type member plates.

Figure 2 is a longitudinal section of a box type number plate constructed according to the invention and, as will be seen, the action of the light rays is somewhat similar to that shown in Figure 1 with the exception that the arrangement is duplicated, a double reflector being fixed in the center of the case, two lamps being provided one at each end thereof.

The structure shown comprises two metallic face plates 1, having openings 2 therein forming the license number or sign. These plates are held in spaced parallel relation by top and bottom trough-like members 3, the sides of which are connected to the upper and lower edges of the plates 1 by means of rivets 4. Within the top and bottom members 3 are arranged semi-cylindrical suports 5, formed with two horizontal side flanges 6 which terminate in vertical flanges 7. The latter are connnected to the top and bottom members 3 and plates 1 by the rivets 4 thus forming a rigid box-like structure.

Back of each metallic plate 1 on the horizontal flanges 6 is removably mounted a colored transparent preferably glass panel 8, the thickness of which corresponds to the width of the flanges 6. These panels are yieldingly held in place against the metallic plates 1 by means of semi-cylindrical reflectors 9, fitted within the top and bottom supporting members 3. The longitudinal edges of these reflectors extend beyond the horizontal flanges 6 thereby overlapping the upper and lower edges of the glass plates 8, and as said reflectors are made of thin sheet metal they provide resilient abutments $9^1$ behind the glass and yieldingly hold the latter against the plates but permitting a slight inward movement thereof when the plates are subjected to jars thus reducing the liability of breaking.

The bottom supporting member 3 is formed with a socket 10 for the reception of an electric-light bulb 11.

The vertical ends of the box-like structure may be closed by suitable slides, (not shown) which are adapted to frictionally engage the ends.

During day-time, when the lamps are out, there is practically no difference visible between the plates according to this invention and the usual enamelled ones with white or colored numbers.

Owing to the impenetrability of light of the plates 1 during night-time, when the lamps are burning, the numbers are lighted and visible at a distance.

According to Figure 2 the lamps are placed laterally opposite each other within the box, light being uniformly distributed on the plates 1 by suitable reflectors 12 placed behind the lamps 11 and another reflector 13 with convex faces and transversely arranged in the center of the plate.

What I claim is:

1. A luminous number plate for motor vehicles and the like having the form of a shallow box, comprising two face plates having openings therein forming the sign, panels of transparent material mounted against the inner faces of the plates, semi-cylindrical members having flanges supporting said panels and connected to said plates, and semi-cylindrical reflectors mounted in said members and having edges forming resilient abutments engaging the inner faces of the panels for yieldingly holding the latter against the face plates, and an electric lamp mounted in one of the semi-cylindrical supporting members.

2. A luminous number plate for motor vehicles and the like having the form of a shallow box, comprising two face plates having openings therein forming the signs, trough-like members connected to the opposite edges of the face plates, panels of transparent material mounted against the inner faces of said plates, semi-cylindrical supports mounted in said members having horizontal longitudinal flanges supporting the upper and lower edges of the panels and longitudinal vertical flanges connected to the face plates, semi-cylindrical reflectors mounted in the supports and having their longitudinal edges extending beyond said horizontal flanges and overlapping the upper and lower edges of said panels, thereby forming resilient abutments for the latter, and an electric lamp mounted in one of the semi-cylindrical supports.

3. A luminous number plate for motor vehicles, having the form of a shallow box comprising two oppositely disposed face plates carrying the signs, panels of transparent material on the inner sides of said plates, semi-cylindrical ends supporting said panels, and provided with flanges connected to the face plates, electric lamps mounted in said ends, semi-cylindrical reflectors mounted in the latter forming abutments for the inner faces of the panels, and a reflector arranged transversely to the face plates midway between the end reflectors.

In testimony that I claim the foregoing as my invention I have signed my name.

FILIPPO GIORDANO.